United States Patent [19]
Husted

[11] Patent Number: 6,039,385
[45] Date of Patent: Mar. 21, 2000

[54] RETRACTABLE AIR DEFLECTOR FOR A VEHICLE

[76] Inventor: Myron J. Husted, P.O. Box 7, Sasabe, Ariz. 85633

[21] Appl. No.: 09/039,935

[22] Filed: Mar. 16, 1998

[51] Int. Cl.⁷ .................................................. B62D 35/00
[52] U.S. Cl. ..................................... 296/180.3; 296/180.5
[58] Field of Search ............................... 296/180.3, 180.5

[56] References Cited

U.S. PATENT DOCUMENTS

| | | | |
|---|---|---|---|
| 3,999,796 | 12/1976 | Greene | 296/180.3 |
| 4,102,548 | 7/1978 | Kangas | 296/180.3 |
| 4,160,494 | 7/1979 | McCambridge | 188/270 |
| 4,313,635 | 2/1982 | Front | 296/180.3 |
| 4,375,898 | 3/1983 | Stephens | 296/1 S |
| 4,470,628 | 9/1984 | Husted | 296/1 S |
| 4,509,786 | 4/1985 | Gregg | 296/180.3 |
| 4,607,874 | 8/1986 | Peairs | 296/180.3 |
| 4,674,788 | 6/1987 | Ohmura et al. | 296/1 S |

*Primary Examiner*—Gary C. Hoge
*Attorney, Agent, or Firm*—Richard L. Miller

[57] ABSTRACT

A retractable air deflector for mounting to a roof of a cab of a vehicle and for selectively deflecting approaching air upwardly thereover. The deflector includes a stationary frame for mounting to a roof of a cab of a vehicle, a movable portion movably mounted to the stationary portion and has an up position and a down position, and moving apparatus for selectively moving the movable portion relative to the stationary frame through the up and down positions. The deflector further includes limiting apparatus for limiting the rise and fall of the movable portion, and a locking arrangement for maintaining the pair of arms of the moving apparatus in the pair of notches in the upper beam of the rear cross member of the stationary frame when the movable portion is in the down position.

30 Claims, 2 Drawing Sheets

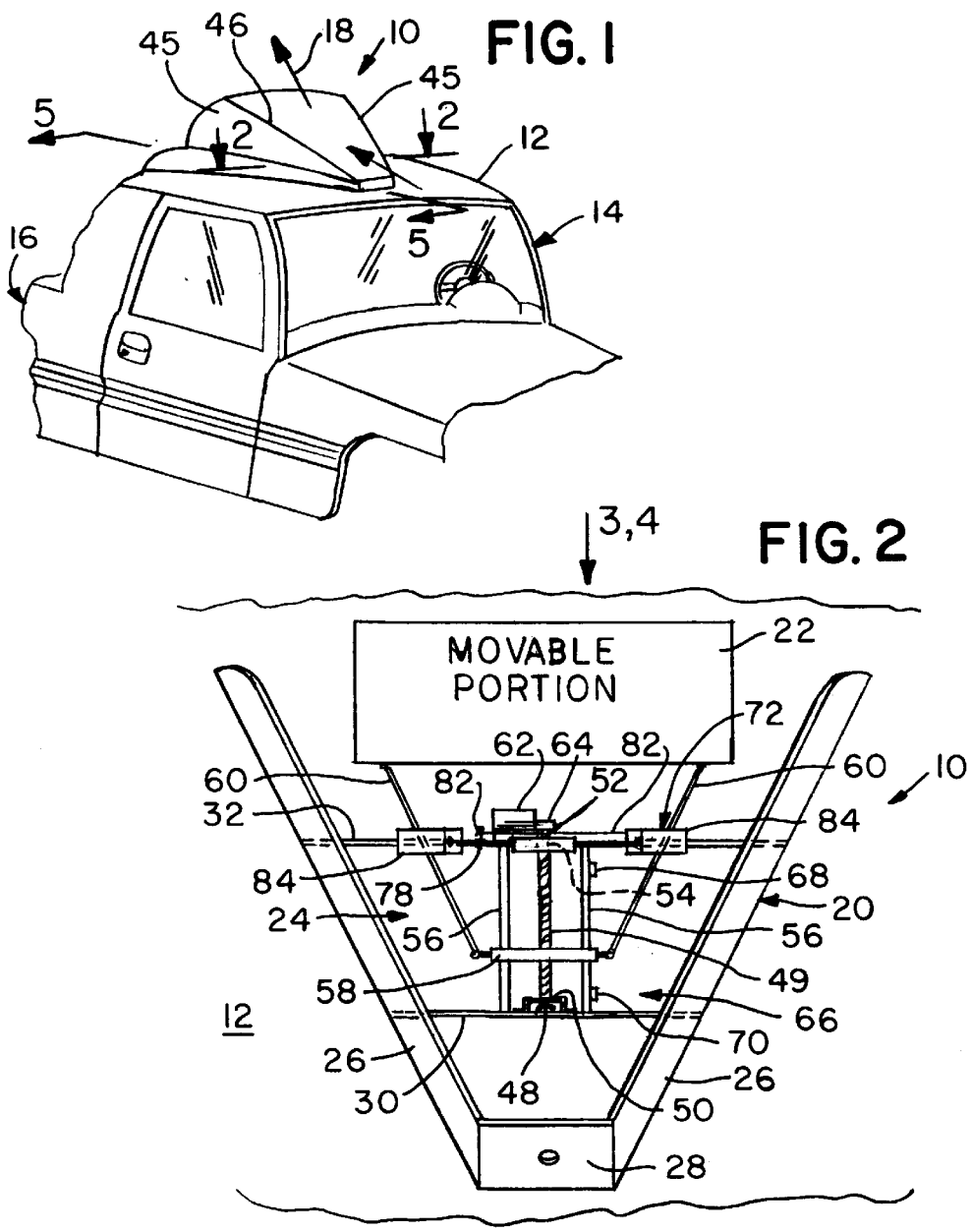

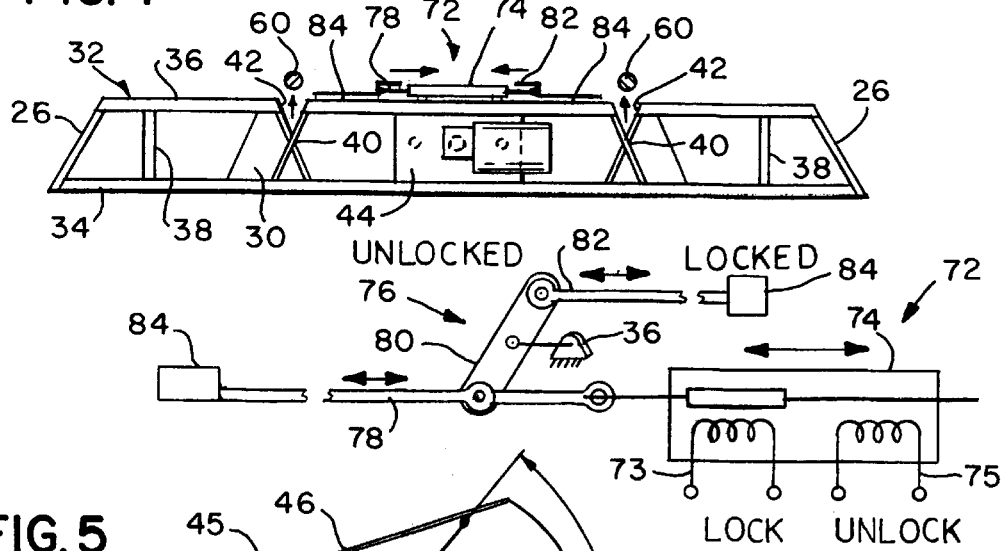
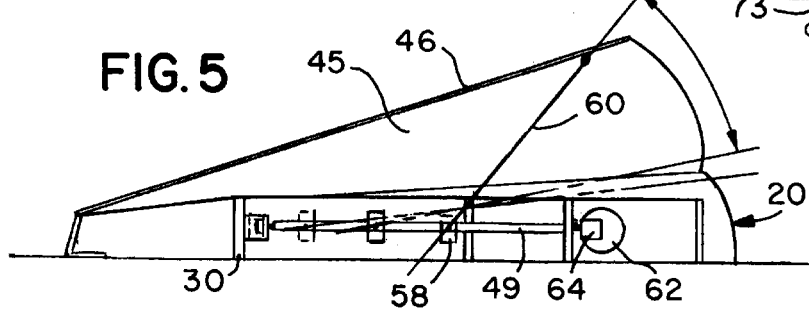

RETRACTABLE AIR DEFLECTOR FOR A VEHICLE

BACKGROUND OF THE INVENTION

1. Field of the Intention

The present invention relates to an air deflector. More particularly, the present invention relates to a retractable air deflector for a vehicle.

2. Description of the Prior Art

It is well known that the high, wide front wall of a truck body creates a considerable drag on the vehicle's forward travel, as this wall strikes flat against the air in front thereof. This drag slows up the vehicle's forward progress, so that more fuel must be burned in order to keep the truck traveling at an efficient rate of speed. This increased use of fuel is objectionable, because fuel is expensive, and this situation is accordingly in need of an improvement.

Numerous innovations for air deflectors have been provided in the prior art that will be described. Even though these innovations may be suitable for the specific individual purposes which they address, however, they differ from the present invention.

FOR EXAMPLE, U.S. Pat. No. 4,160,494 to McCambridge teaches an airfoil pivotally attached to a high speed vehicle that is positioned to produce a braking action on the vehicle by means of fluid-dynamic resistance. The airfoil may be positioned to produce a downward pressure on the vehicle and thus enhance conventional braking action. The braking action is further augmented by eductors which reduce the air pressure behind the airfoil and control the air flow about the airfoil. The eductors and a set of rudders combine to provide the requisite stability for successful high speed braking.

ANOTHER EXAMPLE, U.S. Pat. No. 4,375,898 to Stephens teaches an air deflector assembly for reducing aerodynamic drag on a tractor-trailer vehicle, a full truck or similar automotive vehicles which includes a deflector panel pivotally mounted above the roof of the tractor for deflecting a portion of the air flow passing over the roof upwardly and over the top of the trailer. The deflector panel is reinforced on its rear side by a stiffener having a plurality of diagonally extending segments which increases the torsional stiffness of the panel and permits the use of a single support strut. The strut, which is adjustable so as to permit the panel to be positioned in a retracted position and one or more operating positions, extends between the central portion of the stiffener and a frame mounted to the roof of the truck. Means are provided near the forward end of the frame for pivotal mounting of the deflector panel. In one embodiment of this invention the strut can be extended or retracted by an electrically powered worm drive which can be controlled from the driver's compartment. In another embodiment the strut has two telescopically engaging members which can be locked so as to fix the position of the air deflector panel by means of a removable locking pin.

STILL ANOTHER EXAMPLE, U.S. Pat. No. 4,470,628 to Husted teaches an air deflector mountable upon a truck cab roof so as to deflect air away from a front of the truck body. The deflector includes a mechanism to angularly adjust its side and upper surface for full air deflection with minimum drag.

FINALLY, YET ANOTHER EXAMPLE, U.S. Pat. No. 4,674,788 to Ohmura et al. teaches an air flow control device for an automotive vehicle that includes an air flow control fin pivotably secured near the rear end of a vehicle. The air flow control fin is pivotable to either of two angular positions with respect to the vehicle body. A manual operator is disposed within a vehicle compartment and is connected to the air flow control fin through a remote control mechanism. The air flow control fin is movable between a first spoiler position in which the fin diverts air flowing along vehicle body surface upwards so as to exert a downward force and enhance the traction of the vehicular wheels, and a second air flow guide position in which the fin guides the air flow toward a rear window surface so as to remove rain water, dust and so forth. The manual operator can be operated by a driver in the vehicle compartment to select either the first spoiler position or the second air flow guide position.

It is apparent that numerous innovations for air deflectors have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a retractable air deflector for a vehicle that avoids the disadvantages of the prior art.

ANOTHER OBJECT of the present invention is to provide a retractable air deflector for a vehicle that is simple and inexpensive to manufacture.

STILL ANOTHER OBJECT of the present invention is to provide a retractable air deflector for a vehicle that is simple to use.

BRIEFLY STATED, YET ANOTHER OBJECT of the present invention is to provide a retractable air deflector for mounting to a roof of a cab of a vehicle and for selectively deflecting approaching air upwardly thereover. The deflector includes a stationary frame for mounting to a roof of a cab of a vehicle, a movable portion movably mounted to the stationary portion and has an up position and a down position, and moving apparatus for selectively moving the movable portion relative to the stationary frame through the up and down positions. The deflector further includes limiting apparatus for limiting the rise and fall of the movable portion, and a locking arrangement for maintaining the pair of arms of the moving apparatus in the pair of notches in the upper beam of the rear cross member of the stationary frame when the movable portion is in the down position.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 1 is a diagrammatic perspective view of the present invention installed on a roof of a cab of a vehicle;

FIG. 2 is an enlarged diagrammatic top plan view taken on line 2—2 in FIG. 1;

FIG. 3 is an enlarged diagrammatic rear elevational view taken generally in the direction of arrow 3 in FIG. 2, with the locking apparatus in the locked state;

FIG. 4 is an enlarged diagrammatic rear elevational view taken generally in the direction of arrow 4 in FIG. 2, with the locking apparatus in the unlocked state;

FIG. 5 is an enlarged diagrammatic side elevational view taken along line 5—5 in FIG. 1;

FIG. 6 is an enlarged diagrammatic front elevational view of the area generally enclosed by the dotted ellipse identified by arrow 6 in FIG. 3; and FIG. 7 is a operating circuit diagram of the present invention.

LIST OF REFERENCE NUMERALS UTILIZED IN THE DRAWING 10 retractable air deflector for a vehicle of the present invention
12 roof of cab 14 of vehicle 16
14 cab of vehicle 16
16 vehicle
18 approaching air
20 stationary frame
22 movable portion
24 moving apparatus
26 pair of side walls of stationary frame 20
28 forward plate of stationary frame 20
30 forward cross member of stationary frame 20
32 rear cross member of stationary frame 20
34 lower beam of rear cross member 32 of stationary frame 20
36 upper beam of rear cross member 32 of stationary frame 20
38 pair of uprights of rear cross member 32 of stationary frame 20
40 pair of X members of rear cross member 32 of stationary frame 20
42 pair of notches in upper beam 36 of rear cross member 32 of stationary frame 20
44 motor mounting plate of rear cross member 32 of stationary frame 20
45 pair of side panels of movable portion 22
46 central panel of movable portion 22
47 pair of rubber base mounting bolts of rear cross member 32 of stationary frame 20
48 forward end of threaded rod 49 of moving apparatus 24
49 threaded rod of moving apparatus 24
50 front bushing of moving apparatus 24
52 rear end of threaded rod 49 of moving apparatus 24
54 rear bushing of moving apparatus 24
56 pair of guide rods of moving apparatus 24
58 block of moving apparatus 24
60 pair of arms of moving apparatus 24
62 motor of moving apparatus 24
64 gear drive of moving apparatus 24
66 limiting apparatus
68 up micro switch of limiting apparatus 66
70 down micro switch of limiting apparatus 66
72 locking apparatus
74 bi-directional solenoid of locking apparatus 72
76 linkage arrangement of locking apparatus 72
78 first link of linkage arrangement 76 of locking apparatus 72
80 intermediate link of linkage arrangement 76 of locking apparatus 72
82 second link of linkage arrangement 76 of locking apparatus 72
84 pair of cover plates of locking apparatus 72
86 operating circuit
88 switch of operating circuit 86
90 left blade of switch 88 of operating circuit 86
92 right blade of switch 88 of operating circuit 86
94 up lock contact set of up micro switch 68 of limiting apparatus 66
96 first down lock contact set of down micro switch 70 of limiting apparatus 66
98 second down lock contact set of down micro switch 70 of limiting aoparatus 66
100 power source of operating circuit 86
102 first conductor of operating circuit 86
104 first node of operating circuit 86
106 second conductor of operating circuit 86
108 third conductor of operating circuit 86
110 second node of operating circuit 86
112 fourth conductor of operating circuit 86
114 third node of operating circuit 86
116 fifth conductor of operating circuit 86
118 sixth conductor of operating circuit 86
120 seventh conductor of operating circuit 86
121 eighth conductor of operating circuit 86
122 fourth node of operating circuit 86
124 ninth conductor of operating circuit 86
126 tenth conductor of operating circuit 86
128 eleventh conductor of operating circuit 86
130 fifth node of operating circuit 86

DETAILED DESCRIPTION OF THE PREFERRED EMBODIMENT

Referring now to the figures in which like numerals indicate like parts, and particularly to FIG. 1, the retractable air deflector for a vehicle of the present invention is shown generally at 10 for mounting to a roof 12 of a cab 14 of a vehicle 16 and for selectively deflecting approaching air 18 upwardly thereover.

The configuration of the retractable air deflector for a vehicle 10 can best be seen in FIGS. 1–6, and as such will be discussed with reference thereto.

As shown in FIG. 2, the retractable air deflector for a vehicle 10 comprises a stationary frame 20 for mounting to the roof 12 of the cab 14 of the vehicle 16, a movable portion 22 that is movably mounted to the stationary portion 20 and has an up position and a down position, and moving apparatus 24 for selectively moving the movable portion 20 relative to the stationary frame 20 through the up and down positions.

As shown in FIG. 2, the stationary frame 20 is generally V-shaped and converges forwardly towards the approaching air 18 so as to reduce air resistance. The stationary frame 20 comprises a pair of side walls 26 that are straight and upwardly-inwardly inclined and joined transversely at their forward ends by a forward plate 28.

As shown in FIG. 2, the stationary frame 20 further comprises a forward cross member 30 that is solid and fixedly connects the pair of side walls 26 of the stationary frame 20 transversely, and is spaced behind the forward plate 28 of the stationary frame 20.

As shown in FIG. 2, the stationary frame 20 further comprises a rear cross member 32 that fixedly connects the pair of side walls 26 of the stationary frame 20 transversely, and is spaced behind the forward cross member 30 of the stationary frame 20.

As shown in FIGS. 3 and 4, the rear cross member 32 of the stationary frame 20 comprises a lower beam 34 that connects the pair of side walls 26 of the stationary frame 20, at their lower edges, an upper beam 36 that connects the pair of side walls 26 of the stationary frame 20, at their upper edges, a pair of uprights 38 that connect the lower beam 34 of the rear cross member 32 of the stationary frame 20 to the upper beam 36 of the rear cross member 32 of the stationary frame 20, inwardly of their extremes, a pair of X members 40 that connect the lower beam 34 of the rear cross member 32 of the stationary frame 20 to the upper beam 36 of the rear cross member 32 of the stationary frame 20, inwardly of the pair of uprights 38 of the rear cross member 32 of the stationary frame 20, with the upper beam 36 of the rear cross member 32 of the stationary frame 20 being separated at its intersection with the pair of X members 40 of the rear cross member 32 of the stationary frame 20 so as to form a pair of notches 42 thereat, a motor mounting plate 44 that connects the lower beam 34 of the rear cross member 32 of the stationery frame 20 to the upper beam 36 of the rear cross member 32 of the stationary frame 20, at their midpoints, and a pair of rubber base mounting bolts 47 for mounting the retractable air deflector for vehicles 10 to the roof 12 of the cab 14 of the vehicle 16.

As shown in FIG. 3, the pair of rubber base mounting bolts 47 of the stationary frame 20 depend from the rear cross member 32 of the stationary frame 20, slightly inwardly of the pair of uprights 38 of the rear cross member 32 of the stationary frame 20.

As shown in FIGS. 1 and 5, the movable portion 22 comprises a pair of side panels 45 that are hingedly connected, at their lower edges, to the pair of side walls 26 of the stationary frame 20, at their upper edges, and a central panel 46 that is hingedly connected, at its side edges, to the pair of side panels 45 of the movable portion 22, at their upper edges, and hingedly connected, at its forward edge, to the forward plate 28 of the stationary frame 20, at its upper edge.

As shown in FIGS. 1 and 5, the pair of side panels 45 of the movable portion 22 are substantially triangular-shaped and flat, with their apexes facing forwardly and with their rear edges rounded, and the central portion 46 of the movable portion 22 is substantially trapezoidal-shaped and flat, with its short side facing forwardly.

It is to be understood that the pair of side panels 45 of the movable portion 22 and the central portion 46 of the movable portion 22 can be replaced by the panel arrangement taught by my U.S. Pat. No. : 4,470,628, which is incorporated herein by reference thereto.

As shown in FIG. 2, the moving apparatus 24 is supported on the forward cross member 30 of the stationary frame 20 and the rear cross member 32 of the stationary frame 20.

As shown in FIGS. 2 and 5, the moving apparatus 24 comprises a threaded rod 49 that has a forward end 48 rotatively received in a forward bushing 50 that is affixed to the forward cross member 30 of the stationary frame 20, on its rear side, at its center, with the threaded rod 49 of the moving apparatus 24 extending axially rearwardly therefrom to a rear end 52 that is rotatively received in a rear bushing 54 that is affixed to the rear cross member 32 of the stationary frame 20, on its forward side, at its center, with the threaded rod 49 of the moving apparatus 24 extending rotatively through the motor mounting plate 44 of the rear cross member 32 of the stationary frame 20, at its center.

As shown in FIG. 2, the moving apparatus 24 further comprises a pair of guide rods 56 that extend axially from the forward cross member 30 of the stationary frame 20 to the rear cross member 32 of the stationary frame 20 and are coplanar and parallel with, and straddle, the threaded rod 49 of the moving apparatus 24.

As shown in FIGS. 2 and 5, the moving apparatus 24 further comprises a block 58 that is threaded onto the threaded rod 49 of the moving apparatus 24 so as to be movable therealong when the threaded rod 49 of the moving apparatus 24 is rotated. The block 58 of the moving apparatus 24 slidably receives the pair of guide rods 56 of the moving apparatus 24 so as to prevent the block 58 of the moving apparatus 24 from rotating when the threaded rod 49 of the moving aoparatus 24 is rotated.

As shown in FIGS. 2–5, the moving apparatus 24 further comprises a pair of arms 60 that are pivotally attached, at their forward ends, to the block 58 of the moving apparatus 24, at its sides, and pivotally attached, at their rear ends, to the central panel 46 of the movable portion 22, on its under side, so as to allow the movable portion 22 to be selectively raised and lowered a selective distance, as desired.

As shown in FIGS. 2–5, the moving apparatus 24 further comprises a motor 62 that is 12 volts and reversible, and has an up rotation direction and a down rotation direction.

The motor 62 of the moving apparatus 24 is mounted to the motor mounting plate 44 of the rear cross member 32 of the stationary frame 20, and communicates through a gear drive 64, with the rear end 52 of the threaded rod 49 of the moving apparatus 24 for rotation therewith so as the motor 62 rotates in the up rotation direction, the threaded rod 49 of the moving apparatus 24 rotates in one direction causing the block 58 of the moving apparatus 24 to thread along the threaded rod 49 of the moving apparatus 24 rearwardly and cause the pair of arms 60 of the moving apparatus 24 to rise and raise the movable portion 22, and as the motor 62 rotates in the down rotation direction, the threaded rod 49 of the moving apparatus 24 rotates in the other direction causing the block 58 of the moving apparatus 24 to thread along the threaded rod 49 of the moving apparatus 24 forwardly and cause the pair of arms 60 of the moving apparatus 24 to lower and lower the movable portion 22.

As shown in FIG. 2, the retractable air deflector for vehicles 10 further comprises limiting apparatus 66 for limiting the rise and fall of the movable portion 22.

As shown in FIG. 2, the limiting apparatus 66 comprises a up micro switch 68 that is in electrical communication with the motor 62 of the moving apparatus 24 and is affixed on one guide rod of the pair of guide rods 56 of the moving apparatus 24, slightly forward of the rear cross member 32 of the stationary frame 20 so as the block 58 of the moving apparatus 24 threads rearwardly along the threaded rod 49 of the moving apparatus 24 and contacts the up micro switch 68 of the limiting apparatus 66, the motor 62 stops rotating in the up rotation direction and the movable portion 22 remains in the up position.

It is to be understood that the up position of the movable portion 22 is determined by the placement of the up micro switch 68 of the limiting apparatus 66 on the one guide rod of the pair of guide rods 56 of the moving apparatus 24.

As shown in FIG. 2, the limiting apparatus 66 further comprises a down micro switch 70 that is in electrical communication with the motor 62 of the moving apparatus 24 and is affixed on the one guide rod of the pair of guide rods 56 of the moving apparatus 24, slightly rearward of the front cross member 30 of the stationary frame 20 so as the block 58 of the moving apparatus 24 threads forwardly along the threaded rod 49 of the moving apparatus 24 and contacts the down micro switch 70 of the limiting apparatus 66, the motor 62 stops rotating in the down rotation direction and the movable portion 22 remains in the down position, with the pair of arms 60 of the moving apparatus 24 being cradled in the pair of notches 42 in the upper beam 36 of the rear cross member 32 of the stationary frame 20.

It is to be understood that the down position of the movable portion 22 is determined by the placement of the down micro switch 70 of the limiting apparatus 66 on the one guide rod of the pair of guide rods 56 of the moving apparatus 24.

As shown in FIGS. 2–4, and 6, the retractable air deflector for a vehicle 10 further comprises locking apparatus 72 for selectively maintaining the pair of arms 60 of the moving apparatus 24 cradled in the pair of notches 42 in the upper beam 36 of the rear cross member 32 of the stationary frame 20 when the movable portion 22 is in the down position.

As shown in FIGS. 3, 4, and 6, the locking apparatus 72 comprises a bi-directional solenoid 74 that is disposed longitudinally along the upper beam 36 of the rear cross member 32 of the stationary frame 20, at its center, and has an extended lock position coil 73 and a retracted unlock position coil 75.

As shown in FIGS. 2–4, and 6, the locking apparatus 72 further comprises a linkage arrangement 76 that is operatively connected to the bi-directional solenoid 74 of the locking apparatus 72.

As shown in FIGS. 2–4, and 6, the linkage arrangement 76 of the locking apparatus 72 comprises a first link 78 that is operatively connected, at its proximal end, to the bi-directional solenoid 74 of the locking apparatus 72, and extends away therefrom along the upper beam 36 of the rear cross member 32 of the stationary frame 20, towards one notch of the pair of notches 42 in the upper beam 36 of the rear cross member 32 of the stationary frame 20, where it terminates in a distal end.

As shown in FIGS. 2–4, and 6, the linkage arrangement 76 of the locking apparatus 72 further comprises an intermediate link 80 that is pivotally mounted, at its center, to the upper beam 36 of the rear cross member 32 of the stationary frame 20, and pivotally mounted, at one end, to the first link 78 of the linkage arrangement 76 of the locking apparatus 72, in proximity to the proximal end thereof.

As shown in FIGS. 2–4, and 6, the linkage arrangement 76 of the locking apparatus 72 further comprises a second link 82 that is pivotally mounted, at its proximal end, to the intermediate link 80 of the linkage arrangement 76 of the locking apparatus 72, at its other end, and extends away therefrom in a direction opposite to that of the first link 78 of the linkage arrangement 76 of the locking apparatus 72, and towards the other of the pair of notches 42 in the upper beam 36 of the rear cross member 32 of the stationary frame 20, where it terminates in a distal end.

As shown in FIGS. 2–4, and 6, the locking apparatus 72 further comprises a pair of cover plates 84 that are connected to the distal ends of the first link 78 of the linkage arrangement 76 of the locking apparatus 72 and the second link 82 of the linkage arrangement 76 of the locking apparatus 72 for movement therewith, and selectively closes and opens the pair of notches 42 in the upper beam 36 of the rear cross member 32 of the stationary frame 20, and covers and captures the pair of arms 60 of the moving apparatus 24 in the pair of notches 42 in the upper beam 36 of the rear cross member 32 of the stationary frame 20 when the movable portion 22 is in the down position and the extended lock position coil 73 of the bi-directional solenoid 74 of the locking apparatus 72 is activated which causes the first link 78 of the linkage arrangement 76 of the locking apparatus 72 and the second link 82 of the linkage arrangement 76 of the locking apparatus 72 to extend outwardly and move the pair of cover plates 84 of the linkage arrangement 76 of the locking apparatus 72 outwardly and over and closing the pair of notches 42 in the upper beam 36 of the rear cross member 32 of the stationary frame 20, with the pair of arms 60 of the moving apparatus 24 captured therein and uncovers and frees the pair of arms 60 of the moving apparatus 24 from the pair of notches 42 in the upper beam 36 of the rear cross member 32 of the stationary frame 20 when the movable portion 22 is beginning to achieve the up position and the retracted unlock coil 75 of the bi-directional solenoid 74 of the locking apparatus 72 is activated which causes the first link 78 of the linkage arrangement 76 of the locking apparatus 72 and the second link 82 of the linkage arrangement 76 of the locking apparatus 72 to retract and move the pair of cover plates 84 of the linkage arrangement 76 of the locking apparatus 72 away from and opening the pair of notches 42 in the upper beam 36 of the rear cross member 32 of the stationary frame 20.

The retractable air deflector 10 further comprises an operating circuit 86 which can best be seen in FIG. 7, and as such will be discussed with reference thereto.

The operating circuit 86 comprises a switch 88 that is a two position, center off, momentary toggle switch that has a bat handle, an up position, a down position, a left blade 90, and a right blade 92.

The operating circuit 86 further comprises the up micro switch 68 of the limiting apparatus 66 having an up lock contact set 94.

The operating circuit 86 further comprises the down micro switch 70 of the limiting aoparatus 66 having a first down lock contact set 96 and a second down lock contact set 98.

The up position of the movable portion 22, when it is in the down position, is achieved by moving the switch 88 of the operating circuit 86 to the up position which causes power from a power source 100 to flow from its positive terminal through a first conductor 102 to a first node 104, through a second conductor 106 to the left blade 90 of the switch 88 of the operating circuit 86, through a third conductor 108 to a second node 110, through a fourth conductor 112 to a third node 114, where it splits into a parallel combination of the motor 62 of the moving apparatus 24 and the retracted unlock coil 75 of the bi-directional solenoid 74 of the locking apparatus 72, via a fifth conductor 116 and a sixth conductor 118, respectively, and returns and joins through a seventh conductor 120 and an eighth conductor 121, respectively, to a fourth node 122, then through a ninth conductor 124 to the right blade 92 of the switch 88 of the operating circuit 86, through the up lock contact set 94 of the up micro switch 68 of the limiting apparatus 66, and back through a tenth conductor 126 to the power source 110, which accordingly causes the retracted unlock coil 75 of the bi-directional solenoid 74 of the locking apparatus 72 to energize instantaneously and retract the pair of cover plates 84 of the locking apparatus 72, via the linkage arrangement 76 of the locking apparatus 72, and free the pair of arms 60 of the moving apparatus 24 from their captivity in the pair of notches 42 in the upper beam 36 of the rear cross member 32 of the stationary frame 20, while simultaneously energizing the motor 62 of the moving apparatus 24 causing it to run in the up rotation direction until the block 58 of the moving apparatus 24 contacts and activates the up micro switch 68 of the limiting apparatus 66 which causes the up lock contact set 94 of the up micro switch 68 of the limiting apparatus 66 to open, and accordingly stop the motor 62 of the moving apparatus 24 from running.

The down position of the movable portion 22, when it is in the up position, is achieved by moving the switch 88 of the operating circuit 86 to the down position which causes power from the power source 100 to flow from its positive terminal through the first conductor 102 to the first node 104, through an eleventh conductor 128 to a fifth node 130 to the first down lock contact set 96 of the down micro switch 70 of the limiting apparatus 66, through the right blade 92 of the switch 88 of the operating circuit 86, through the ninth conductor 124 to the fourth node 122, where it splits into the parallel combination of the motor 62 of the moving apparatus 24 and the retracted unlock coil 75 of the bi-directional solenoid 74 of the locking apparatus 72, via the seventh conductor 120 and the eighth conductor 121, respectively, and returns and joins through the fifth conductor 116 and the sixth conductor 118, respectively, to the third node 114, then through the fourth conductor 112 to the second node 110, through the third conductor 108 to the left blade 90 of the switch 88 of the operating circuit 86, and then through the tenth conductor 126 back to the power source 100, accordingly causing the motor 62 of the moving apparatus 24 to rotate in the down rotation direction until the block 58 of the moving apparatus 24 contacts and activates the down micro switch 70 of the limiting apparatus 66 which opens the first down lock contact set 96 of the down micro switch 70 of the limiting apparatus 66, while simultaneously closing the second down lock contact set 98 of the down micro switch 70 of the limiting apparatus 66, which respectively causes the motor 62 of the moving apparatus 24 to stop running and the extended lock position coil 73 of the bi-directional solenoid 74 of the locking apparatus 72 to be energized and extend the pair of cover plates 84 of the locking apparatus 72, via the linkage arrangement 76 of the locking apparatus 72, and cover and capture the pair of arms 60 of the moving apparatus 24 in the pair of notches 42 in the upper beam 36 of the rear cross member 32 of the stationary frame 20, at which time the bat handle of the switch 88 of the operating circuit 86 is released and the extended lock position coil 73 of the bi-directional solenoid 74 of the locking apparatus 72 is unenergized, but with the bi-directional solenoid 74 of the locking apparatus 72 remaining extended by virtue of the bi-directional solenoid 74 of the locking apparatus 72 having 2 states which it toggles between, i.e. locked and unlocked, and its always remaining in its last energized state.

It will be understood that each of the elements described above, or two or more together, may also find a useful application in other types of constructions differing from the types described above.

While the invention has been illustrated and described as embodied in a retractable air deflector for a vehicle, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A retractable air deflector for mounting to a roof of a cab of a vehicle and for selectively deflecting approaching air upwardly thereover, comprising:
   a) a stationary frame for mounting to a roof of a cab of a vehicle; said stationary frame comprising a pair of side walls being straight and upwardly-inwardly inclined and joined transversely at their forward ends by a forward plate;
   b) a movable portion movably mounted to said stationary portion and having an up position and a down position; and
   c) first means for selectively moving said movable portion relative to said stationary frame through said up and down positions.

2. The deflector as defined in claim 1, wherein said stationary frame is generally V-shaped and converges forwardly towards the approaching air so as to reduce air resistance.

3. The deflector as defined in claim 1, wherein said stationary frame further comprises a forward cross member that is solid and fixedly connects said pair of side walls of said stationary frame transversely, and is spaced behind said forward plate of said stationary frame.

4. The deflector as defined in claim 3, wherein said stationary frame further comprises a rear cross member that fixedly connects said pair of side walls of said stationary frame transversely, and is spaced behind said forward cross member of said stationary frame.

5. The deflector as defined in claim 4, wherein said rear cross member of said stationary frame comprises a lower beam that connects said pair of side walls of said stationary frame, at their lower edges, an upper beam that connects said pair of side walls of said stationary frame, at their upper edges, a pair of uprights that connect said lower beam of said rear cross member of said stationary frame to said upper beam of said rear cross member of said stationary frame, inwardly of their extremes, a pair of X members that connect said lower beam of said rear cross member of said stationary frame to said upper beam of said rear cross member of said stationary frame, inwardly of said pair of uprights of said rear cross member of said stationary frame, with said upper beam of said rear cross member of said stationary frame being separated at its intersection with said pair of X members of said rear cross member of said stationary frame so as to form a pair of notches thereat, a motor mounting plate that connects said lower beam of said rear cross member of said stationary frame to said upper beam of said rear cross member of said stationary frame, at their midpoints, and a pair of rubber base mounting bolts for mounting said retractable air deflector to the roof of the cab of the vehicle.

6. The deflector as defined in claim 5, wherein said pair of rubber base mounting bolts of said stationary frame depend from said rear cross member of said stationary frame, slightly inwardly of said pair of uprights of said rear cross member of said stationary frame.

7. The deflector as defined in claim 6, wherein said movable portion comprises a pair of side panels that are hingedly connected, at their lower edges, to said pair of side walls of said stationary frame, at their upper edges, and a central panel that is hingedly connected, at its side edges, to said pair of side panels of said movable portion, at their upper edges, and hingedly connected, at its forward edge, to said forward plate of said stationary frame, at its upper edge.

8. The deflector as defined in claim 7, wherein said pair of side panels of said movable portion are substantially triangular-shaped and flat, with their apexes facing forwardly and with their rear edges rounded, and said central portion of said movable portion is substantially trapezoidal-shaped and flat, with its short side facing forwardly.

9. The deflector as defined in claim 4, wherein said first means is supported on said forward cross member of said stationary frame and said rear cross member of said stationary frame.

10. The deflector as defined in claim 7, wherein said first means comprises a threaded rod that has a forward end rotatively received in a forward bushing that is affixed to said forward cross member of said stationary frame, on its rear side, at its center, with said threaded rod of said first means extending axially rearwardly therefrom to a rear end that is rotatively received in a rear bushing that is affixed to said rear cross member of said stationary frame, on its forward side, at its center, with said threaded rod of said first means extending rotatively through said motor mounting plate of said rear cross member of said stationary frame, at its center.

11. The deflector as defined in claim 10, wherein said first means further comprises a pair of guide rods that extend axially from said forward cross member of said stationary frame to said rear cross member of said stationary frame and are coplanar and parallel with, and straddle, said threaded rod of said first means.

12. The deflector as defined in claim 11, wherein said first means further comprises a block that is threaded onto said threaded rod of said first means so as to be movable therealong when said threaded rod of said first means is rotated.

13. The deflector as defined in claim 12, wherein said block of said first means slidably receives said pair of guide rods of said first means so as to prevent said block of said first means from rotating when said threaded rod of said first means is rotated.

14. The deflector as defined in claim 13, wherein said first means further comprises a pair of arms that are pivotally attached, at their forward ends, to said block of said first means, at its sides, and pivotally attached, at their rear ends, to said central panel of said movable portion, on its under side, so as to allow said movable portion to be selectively raised and lowered a selective distance, as desired.

15. The deflector as defined in claim 14, wherein said first means further comprises a motor that is 12 volts and reversible, and has an up rotation direction and a down rotation direction; said motor of said first means is mounted to said motor mounting plate of said rear cross member of said stationary frame, and communicates through a gear drive with said rear end of said threaded rod of said first means for rotation therewith so as said motor of said first means rotates in said up rotation direction, said threaded rod of said first means rotates in one direction causing said block of said first means to thread along said threaded rod of said first means rearwardly and cause said pair of arms of said first means to rise and raise said movable portion, and as said motor rotates in said down rotation direction, said threaded rod of said first means rotates in the other direction causing said block of said first means to thread along said threaded rod of said first means forwardly and cause said pair of arms of said first means to lower and lower said movable portion.

16. The deflector as defined in claim 15; further comprising second means for limiting rise and fall of said movable portion.

17. The deflector as defined in claim 16, wherein said second means comprises an up micro switch that is in electrical communication with said motor of said first means and is affixed on one guide rod of said pair of guide rods of said first means, slightly forward of said rear cross member of said stationary frame so as said block of said first means threads rearwardly along said threaded rod of said first a means and contacts said up micro switch of said second means, said motor of said first means stops rotating in said up rotation direction and said movable portion remains in said up position.

18. The deflector as defined in claim 16, wherein said second means further comprises a down micro switch that is in electrical communication with said motor of said first means and is affixed on said one guide rod of said pair of guide rods of said first means, slightly rearward of said front cross member of said stationary frame so as said block of said first means threads forwardly along said threaded rod of said first means and contacts said down micro switch of said second means, said motor stops rotating in said down rotation direction and said movable portion remains in said down position, with said pair of arms of said first means being cradled in said pair of notches in said upper beam of said rear cross member of said stationary frame.

19. The deflector as defined in claim 18; further comprising third means for maintaining said pair of arms of said first means in said pair of notches in said upper beam of said rear cross member of said stationary frame when said movable portion is in said down position.

20. The deflector as defined in claim 19, wherein said third means comprises a bi-directional solenoid that is disposed longitudinally along said upper beam of said rear cross member of said stationary frame, at its center, and has an extended lock coil and a retracted unlock coil.

21. The deflector as defined in claim 20, wherein said third means further comprises a linkage arrangement that is operatively connected to said bi-directional solenoid of said third means.

22. The deflector as defined in claim 21, wherein said linkage arrangement of said third means comprises a first link that is operatively connected, at its proximal end, to said bi-directional solenoid of said third means, and extends away therefrom along said upper beam of said rear cross member of said stationary frame, towards one notch of said pair of notches in said upper beam of said rear cross member of said stationary frame, where it terminates in a distal end.

23. The deflector as defined in claim 22, wherein said linkage arrangement of said third means further comprises an intermediate link that is pivotally mounted, at its center, to said upper beam of said rear cross member of said stationary frame, and pivotally mounted, at one end, to said first link of said linkage arrangement of said third means, in proximity to said proximal end thereof.

24. The deflector as defined in claim 23, wherein said linkage arrangement of said third means further comprises a second link that is pivotally mounted, at its proximal end, to said intermediate link of said linkage arrangement of said third means, at its other end, and extends away therefrom in a direction opposite to that of said first link of said linkage arrangement of said third means, and towards the other notch of said pair of notches in said upper beam of said rear cross member of said stationary frame, where it terminates in a distal end.

25. The deflector as defined in claim 24, wherein said linkage arrangement of said third means further comprises a pair of cover plates that are connected to said distal ends of said first link of said linkage arrangement of said third means and said second link of said linkage arrangement of said third means for movement therewith and selectively closes and opens said pair of notches in said upper beam of said rear cross member of said stationary frame and covers and captures said pair of arms of said first means in said pair of notches in said upper beam of said rear cross member of said stationary frame when said movable portion is in said down position and said extended lock coil of said bi-directional solenoid of said third means is activated which causes said first link of said linkage arrangement of said third means and said second link of said linkage arrangement of said third means to extend outwardly and move said pair of cover plates of said linkage arrangement of said third means outwardly and over and closing said pair of notches in said upper beam of said rear cross member of said stationary frame with said pair of arms of said first means captured therein and uncovers and frees said pair of arms of said first means from said pair of notches in said upper beam of said rear cross member of said stationary frame when said movable portion is beginning to achieve said up position and said retracted unlock coil of the bi-directional solenoid of said third means is activated which causes said first link of said linkage arrangement of said third means and said second link of said linkage arrangement of said third means to retract inwardly and move said pair of cover plates of said linkage arrangement of said third means inwardly away from and opening said pair of notches in said upper beam of said rear cross member of said stationary frame with said pair of arms of said first means being freed therefrom.

26. The deflector as defined in claim 25; further comprising an operating circuit comprising a switch being a two position, center off, momentary toggle switch having a bat handle, an up position, a down position, a left blade, and a right blade.

27. The deflector as defined in claim 26, wherein said operating circuit further comprises said up micro switch of said a second means having an up lock contact set.

28. The deflector as defined in claim 27, wherein said operating circuit further comprises said down micro switch of said second means having a first down lock contact set and a second down lock contact set.

29. The deflector as defined in claim 28, wherein said up position of said movable portion, when it is in said down position, is achieved by moving said switch of said operating circuit to said up position which causes power from a power source to flow from its positive terminal through a first conductor to a first node, through a second conductor to said left blade of said switch of said operating circuit, through a third conductor to a second node, through a fourth conductor to a third node, where it splits into a parallel combination of said motor of said first means and said retracted unlock coil of said bi-directional solenoid of said third means, via a fifth conductor and a sixth conductor, respectively, and returns and joins through a seventh conductor and an eighth conductor, respectively, to a fourth node, through a ninth conductor to said right blade of said switch of said operating circuit, through said up lock contact set of said up micro switch of said second means, and back through a tenth conductor to the power source, which accordingly causes said retracted unlock coil of said bi-directional solenoid of said third means to energize instantaneously and retract said pair of cover plates of said third means, via said linkage arrangement of said third means, and free said pair of arms of said first means from their captivity in said pair of notches in said upper beam of said rear cross member of said stationary frame, while simultaneously energizing said motor of said first means causing it to run in said up rotation direction until said block of said first means contacts and activates said up micro switch of said second means which causes said up lock contact set of said up micro switch of said second means to open, and accordingly stop said motor of said first means from running.

30. The deflector as defined in claim 29, wherein said down position of said movable portion, when it is in said up position, is achieved by moving said switch of said operating circuit to said down position which causes power from the power source to flow from its positive terminal through said first conductor to said first node, through an eleventh conductor to a fifth node to said first down lock contact set of said down micro switch of said second means, through said right blade of said switch of said operating circuit, through said ninth conductor to said fourth node, where it splits into said parallel combination of said motor of said first means and said retracted unlock coil of said bi-directional solenoid of said third means, via said seventh conductor and said eighth conductor, respectively, and returns and joins through said fifth conductor and said sixth conductor, respectively, to said third node, then through said fourth conductor to said second node, through said left blade of said switch of said operating circuit, and through said tenth conductor back to the power source, accordingly causing said motor of said first means to rotate in said down rotation direction until said block of said first means contacts and activates said down micro switch of said second means which opens said first down lock contact set of said down micro switch of said second means, while simultaneously closing said second down lock contact set of said down micro switch of said second means, which respectively causes said motor of said first means to stop running and said extended lock position coil of said bi-directional solenoid of said third means to be energized and extend said pair of cover plates of said third means, via said linkage arrangement of said third means, and cover and capture said pair of arms of said first means in said pair of notches in said upper beam of said rear cross member of said stationary frame, at which time said bat handle of said switch of said operating circuit is released and said extended lock position coil of said bi-directional solenoid of said third means is unenergized, but with said bi-directional solenoid of said third means remaining extended by virtue of said bi-directional solenoid of said third means having 2 states which it toggles between and always remaining in its last energized state.

\* \* \* \* \*